V. C. CRITES.
PHOTOMETRIC DEVICE.
APPLICATION FILED JAN. 9, 1920.

1,379,172.

Patented May 24, 1921.
2 SHEETS—SHEET 1.

Witness:

Inventor:
Virgil C. Crites,

V. C. CRITES.
PHOTOMETRIC DEVICE.
APPLICATION FILED JAN. 9, 1920.
1,379,172.
Patented May 24, 1921.
2 SHEETS—SHEET 2.
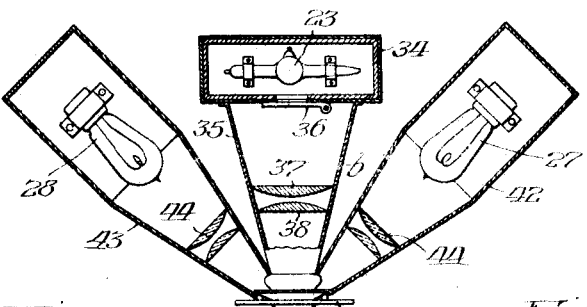
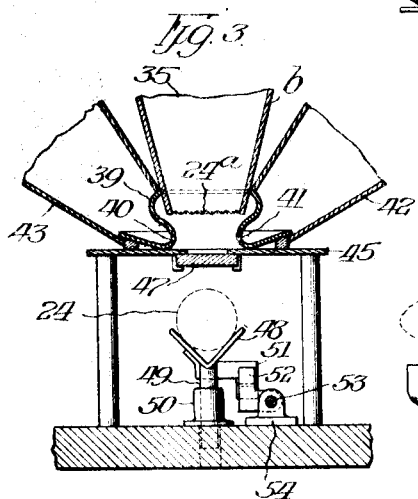
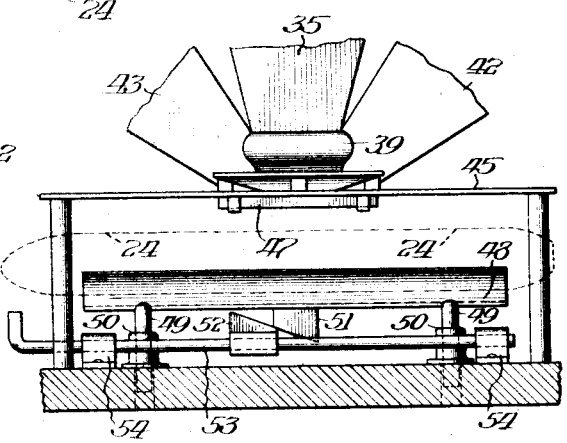
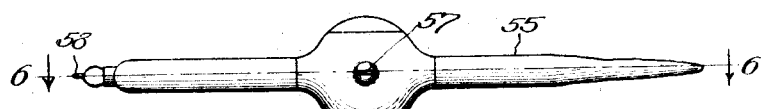
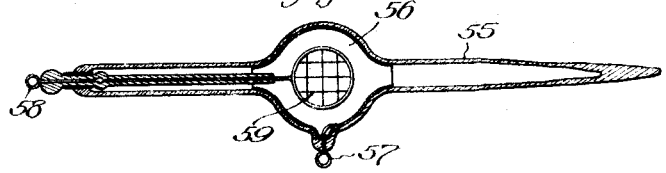
Witness:
Fd. C. Harrison
Inventor:
Virgil C. Crites,
By Zabel & Mueller
Attys

UNITED STATES PATENT OFFICE.

VIRGIL C. CRITES, OF CHICAGO, ILLINOIS.

PHOTOMETRIC DEVICE.

1,379,172.     Specification of Letters Patent.     Patented May 24, 1921.

Application filed January 9, 1920. Serial No. 350,406.

*To all whom it may concern:*

Be it known that I, VIRGIL C. CRITES, a citizen of the United States, residing at Chicago, in the county of Cook and State of Illinois, have invented a certain new and useful Improvement in Photometric Devices, of which the following is a full, clear, concise, and exact description, reference being had to the accompanying drawings, forming a part of this specification.

My invention relates to photometric devices and is designed to provide a system by virtue of which the variations of a photoelectric cell may be suitably amplified so that these indications can be measured with proper instruments, or for other purposes.

In accordance with my invention, I utilize an electron discharge tube and in the preferred form of carrying out my invention establish a suitable residual flow through said tube. In this preferred form, I then utilize two photo-electric cells, preferably reversely associated with the electron discharge tube, one of these cells serving to oppose the residual flow through the electron discharge tube, or even in certain cases to act upon the grid or other suitable element of the tube, in such manner that a condition is brought about which would be more than sufficient to oppose the residual flow through the said tube. The second photo-electric cell is then utilized by me to vary the conditions in the said electron discharge tube in such a manner that the variations of flow through the second photo-electric cell may, after having been suitably amplified through the agency of the said tube, be indicated upon a suitable instrument included in the system for that purpose when it is merely desired to utilize the current variations for indicating purposes.

It must be understood that the amplified current variations may be used for purposes other than merely for indicating or actuating the movable member of an indicating or recording instrument I will explain my invention more in detail by referring to the accompanying drawing illustrating the same, in which—

Fig. 2 is an enlarged detail view of one form of structure for controlling the application of light variations to the photo-electric cell;

Fig. 3 is an enlarged fragmentary detailed view of one part of the apparatus illustrated in Fig. 2, together with one form of object carrier;

Fig. 4 is a side view thereof;

Fig. 5 is a top view of the photo-electric cell;

Fig. 6 is a sectional view on line 6—6 of Fig. 5; and

Fig. 7 is a detail view of the object plate.

Figure 1:
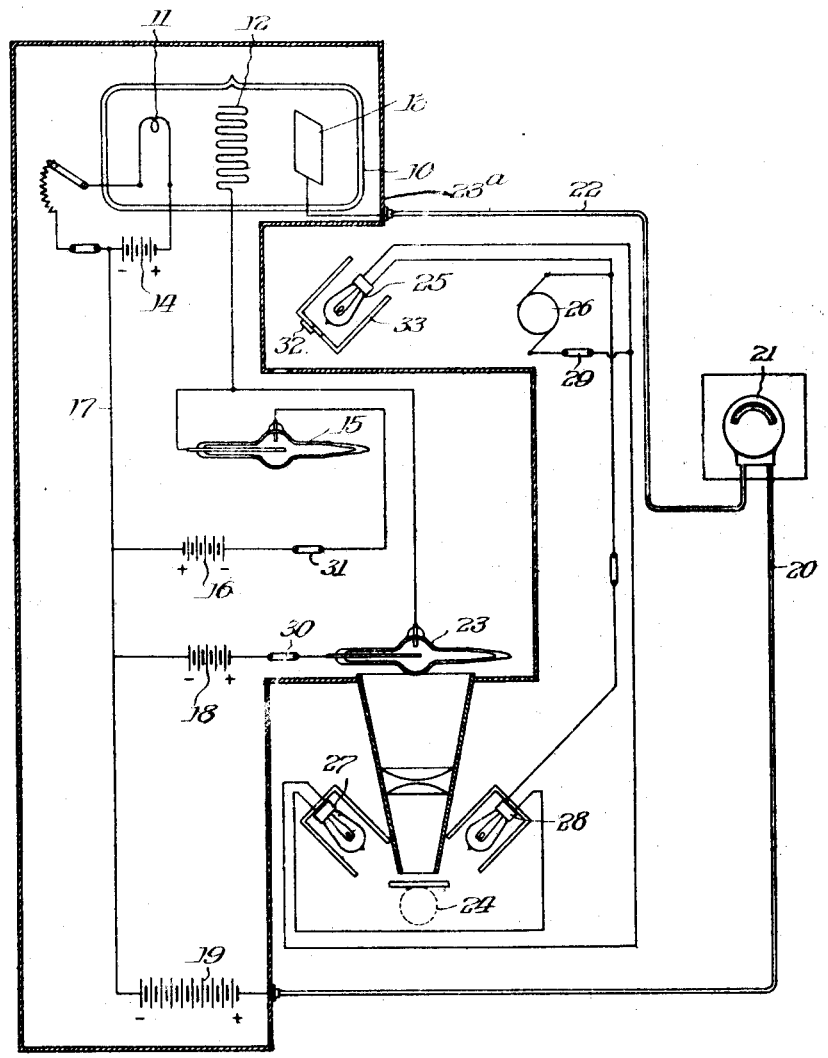
Figure 1 is a diagrammatic representation of a system arranged in accordance with my invention.

By referring more particularly to Fig. 1, I show an electron discharge tube 10 having the filament 11, grid 12 and plate 13. A suitable battery 14 serves to energize the filament 11 thereby to place the tube 10 in condition for establishing an electronic stream such energization being sufficient to bring about a saturated condition in said tube. A photo-electric cell 15 has one of its terminals connected to the grid 12 and its remaining terminal connected with a battery 16, whose free terminal is connected with a conductor 17 forming part of the external circuit of the tube 10. Thus conductor 17, as readily apparent from the illustration, is connected to one terminal of the filament 11 and therefore to one terminal of the battery 14. It will be noted that the conductor 17 is associated with the negative terminal of the battery 14, the positive terminal of the battery 16, the negative terminal of the battery 18 and the negative terminal of the battery 19.

Although definite voltages are not absolutely required, I have found in practice that in the particular arrangement of apparatus with a given particular size of photo-electric cell and electron discharge tube, that I get good results if the voltage of the battery 14 is about six volts, the voltage of the batteries 16 and 18 each one hundred and twenty volts and the voltage of the battery 19 about three hundred and fifty volts.

The external circuit of the electron discharge tube 10 extends by way of the conductor 17 through the battery 19, conductor 20, indicating instrument 21, conductor 22, back to the plate 13 of the tube 10.

I provide a second photo-electric cell 23 which, as seen from Fig. 1, I connect to the electron discharge tube 10 in a manner reverse to the connection of the photo-electric cell 15. The photo-electric cell 23 has certain apparatus which will be presently explained whereby objects, such as the object 24, and which objects are of different color or light effect, affect the photo-electric cell 23 in proportion to their lighting effect so that the indicating instrument 21 may indicate the color or other lighting effect of successive objects 24 that are placed within the range of the photo-electric cell 23.

Cell 15 is unsensitized so that its characteristics remain constant under the influence of the steady light source 25, while cell 23 is sensitized so as to make it more sensitive and more readily responsive to slight changes in light. It is therefore more delicate.

In one form of application of my improved device, I have utilized it for determining the color of cigars placed within the range of the cell 23, such a cigar being diagrammatically indicated as the object 24 in the drawing, Fig. 1.

A screen 24$^a$ placed between the object 24 and the cell 23 is of such characteristics that it prevents the 60 cycle Hertzian waves (due to the use of 60 cycle current in the lamps 27 and 28) from influencing the cell 23.

A lead shell 23$^a$ surrounds all of the cells and tubes to prevent their being influenced by external disturbances.

The photo-electric cell 15 is under the influence of a source of light 25, which source of light receives its current from any suitable source of current such as indicated at 26. The illumination of the objects 24 is brought about by suitable sources of light 27 and 28, also connected to the same source of current 26. I prefer to have the lamp or source of light 25 of two hundred and fifty volts and the lamps 27 and 28 of one hundred and twenty-five volts each, if the primary source of current 26 is a two hundred and fifty volt system. The photo-electric cell 15 is designed for the purpose of controlling the residual condition of the tube 10, as will be presently explained. For this reason the photo-electric cell 15 is for a certain adjustment to be continually illuminated by the lamp 25.

Now it may be that there is a variation in the impressed pressure from the source 26 so that there would be variations in the lighting effect of the lamp 25. This might tend to impair the correctness of the variations of the system if it were not that the variations in lighting effect of the lamp 25 will be the same as that of the lamps 27 and 28 so that if the lighting effect of the lamp 25 is lowered, the lighting effect of the lamps 27 and 28 upon the object 24 is correspondingly lowered so that the indications of the system are independent of any normal variations in the source of pressure of the circuit supplied by the generator 26.

I have explained the general arrangement of the electrical connections of the various devices constituting the system. It will be noted that the variations in current flow of the cell 23 are suitably amplified by the electron discharge tube 10 so that they are not susceptible of accurate measurement by the instrument 21.

In the operation of the system as thus connected up, I first connect into the circuit the battery 14 to energize the filament 11 and thereby establish a residual flow of current through the electron discharge tube and its external circuit, which as before explained includes the conductors 17, 20 and 22. I then cause an illumination of the lamps 25, 27 and 28, suitable switches 29, 30 and 31 being provided for this purpose and for controlling the circuits through the photo-electric cells. I then connect the photo-electric cell 15 into the circuit and so adjust the current strength that there is no longer any residual flow through the electron discharge tube 10. This result may be brought about by varying the position of the plate 32 which controls the degree of opening through the housing 33 surrounding the lamp 25. I then connect the photo-electric cell 23 into the circuit and cause it to become operative by placing an object 24 within its optical range. If the indication on the instrument 21 is too great for an object 24 of somewhat near the average lighting effect, then I intensify the opposing action of the photo-electric cell 15 in order to maintain the needle of the indicating instrument within a proper zone of action. In this manner the system may be adjusted for an exceedingly large range of tests or readings.

The structure by virtue of which the lighting or color effect of the object 24 alone influences the readings or actuations of the photo-electric cell 23 are more clearly set forth in Figs. 2 and 3.

The photo-electric cell 23 is inclosed in a suitable housing 34 so as to shield the cell against external light. A tube 35 projects from the housing 34 and its larger opened end surrounds the opening 36 in the housing 34, the connection between the two devices being such that no external light enters. The tube 35 is provided with suitable lenses 37 and 38. The smaller opened end of the tube 35 is provided with a surrounding shield 39 having suitable openings 40 and 41 through which the light emitted by the lamps 27 and 28 enters. The lamps 27 and 28 are suitably inclosed in housings 42 and 43, these housing being provided with lenses 44 to properly direct the light rays. A plate 45 crosses the opened end of the cell 39 and this plate has an opening 46 through which the object 24 is brought within the optical range of the cell 23 and is illuminated along the point of said slot or hole 46 by the lamps 27 and 28. I provide a glass cover plate 47 suitably blackened around the edges, which glass plate is somewhat larger than the opening 46, and against which the object 24 is pressed so as to give it a smooth surface. By virtue of this arrangement the same amount of surface of each succeeding object 24 is exposed within the optical range of the cell 23. The elements 35 and 39 are preferably rectangular in cross section, that is, in a plane at right angles to the long axis of the tube 35. In the particular form of application of the device succeeding cigars 24 are placed in the position indicated by the objects 24 and the actual color of these cigars relatively speaking is indicated upon the instrument 21. If the range of color is wide then the instrument 21 should be properly calibrated because the amplification runs in the form of a straight line curve relatively to the changes in color of the various objects 24.

In Figs. 3 and 4 I show a structure for adjusting the position of the cigar or object 24 against the object plate 47. This structure consists of the object carrier 48 which is supported upon two standards 49, 49. These standards are slidably mounted in blocks 50, 50 so that the object carrier can be raised or lowered. The object carrier has a cam 51 which coöperates with a cam 52 supported upon a longitudinally slidable rod 53. This rod is slidable in bearings 54. By moving the rod 53 to the right (Fig. 4) the object 24 is raised against the glass 47 and by moving it to the left lowers the object away from the glass.

In Figs. 5 and 6 I have the photo-electric cell either 15 or 23 which I prefer to employ, and this cell consists of an evacuated glass envelop 55. One surface 56 of the bowl of this glass envelop has mercury distilled thereon. This mercury coating has a superposed coating of potassium. The cathode is shown at 57 and the anode at 58. The cathode is grounded to the potassium coating. The anode has a grid surface 59, all as clearly shown in Figs. 5 and 6.

From what has been thus described the nature of my invention will be readily clear to those skilled in the art. It must be understood that the description and illustration herein of one specific form or mode of application of my invention does not limit me to such specific form or mode of application.

I claim the following:

1. A system of the character described comprising an electron discharge tube, a photo-electric cell connected to said tube whereby the variations of current in said cell are amplified by said tube, and a further photo-electric cell to control the residual electric condition of said tube.

2. A system of the character described comprising an electron discharge tube, a photo-electric cell connected to said tube whereby the variations of current in said cell are amplified by said tube, and a further photo-electric cell to control the residual electric condition of said tube, said cells being reversely connected with said tube.

3. A system of the character described comprising an electron discharge tube, a photo-electric cell connected to said tube whereby the variations of current in said cell are amplified by said tube, a further photo-electric cell to control the residual electric condition of said tube, and means whereby both of said cells receive their light from the same source of power.

4. A system of the character described comprising an electron discharge tube, a photo-electric cell connected to said tube whereby the variations of current in said cell are amplified by said tube, a further photo-electric cell to control the residual electric condition of said tube, said cells being reversely connected with said tube, and means whereby both of said cells receive their light from the same source of power.

5. A system of the character described comprising an electron discharge tube, a photo-electric cell connected to the grid of said tube whereby the variations of current in said cell are amplified by said tube, and a further photo-electric cell to control the residual electric condition of said tube.

6. A system of the character described comprising an electron discharge tube, a photo-electric cell connected to the grid of said tube whereby the variations of current in said cell are amplified by said tube, and a further photo-electric cell to control the residual electric condition of said tube, said cells being reversely connected with said tube.

7. A system of the character described comprising an electron discharge tube, a photo-electric cell connected to the grid of said tube whereby the variations of current in said cell are amplified by said tube, a further photo-electric cell to control the residual electric condition of said tube, and means whereby both of said cells receive their light from the same source of power.

8. A system of the character described comprising an electron discharge tube, a photo-electric cell connected to the grid of said tube whereby the variations of current in said cell are amplified by said tube, a further photo-electric cell to control the residual electric condition of said tube, said cells being reversely connected with said tube, and means whereby both of said cells receive their light from the same source of power.

9. A system of the character described comprising an electron discharge tube, a photo-electric cell connected to said tube whereby the variations of current in said cell are amplified by said tube, and a further photo-electric cell to adjustably control the residual electric condition of said tube.

10. A system of the character described comprising an electron discharge tube, a photo-electric cell connected to said tube whereby the variations of current in said cell are amplified by said tube, and a further photo-electric cell to adjustably control the residual electric condition of said tube, said cells being reversely connected with said tube.

11. A system of the character described comprising an electron discharge tube, a photo-electric cell connected to said tube whereby the variations of current in said cell are amplified by said tube, a further photo-electric cell to adjustably control the residual electric condition of said tube, and means whereby both of said cells receive their light from the same source of power.

12. A system of the character described comprising an electron discharge tube, a photo-electric cell connected to said tube whereby the variations of current in said cell are amplified by said tube, a further photo-electric cell to adjustably control the residual electric condition of said tube, said cells being reversely connected with said tube, and means whereby both of said cells receive their light from the same source of power.

13. A system of the character described comprising an electron discharge tube, a photo-electric cell connected to the grid of said tube whereby the variations of current in said cell are amplified by said tube, and a further photo-electric cell to adjustably control the residual electric condition of said tube.

14. A system of the character described comprising an electron discharge tube, a photo-electric cell connected to the grid of said tube whereby the variations of current in said cell are amplified by said tube, and a further photo-electric cell to adjustably control the residual electric condition of said tube, said cells being reversely connected with said tube.

15. A system of the character described comprising an electron discharge tube, a photo-electric cell connected to the grid of said tube whereby the variations of current in said cell are amplified by said tube, a further photo-electric cell to adjustably control the residual electric condition of said tube, and means whereby both of said cells receive their light from the same source of power.

16. A system of the character described comprising an electron discharge tube, a photo-electric cell connected to the grid of said tube whereby the variations of current in said cell are amplified by said tube, a further photo-electric cell to adjustably control the residual electric condition of said tube, said cells being reservely connected with said tube, and means whereby both of said cells receive their light from the same source of power.

In witness whereof I hereunto subscribe my name this 20th day of December, A. D. 1919.

VIRGIL C. CRITES.